(12) United States Patent
Jiang

(10) Patent No.: US 8,396,197 B2
(45) Date of Patent: Mar. 12, 2013

(54) METHOD, DEVICE, AND SYSTEM FOR IMPLEMENTING VIDEO CALL

(75) Inventor: Chaoqun Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 422 days.

(21) Appl. No.: 12/815,697

(22) Filed: Jun. 15, 2010

(65) Prior Publication Data

US 2010/0321464 A1    Dec. 23, 2010

(30) Foreign Application Priority Data

Jun. 17, 2009   (CN) .......................... 2009 1 0203685

(51) Int. Cl.
 *H04M 11/00*   (2006.01)
(52) U.S. Cl. ................ 379/93.21; 379/158; 379/202.01; 348/14.1; 348/14.08; 348/14.07; 348/14.02
(58) Field of Classification Search ............... 348/14.01, 348/14.02, 14.04, 14.07, 14.08, 14.1; 379/93.21; 379/158, 202.01, 204.01
See application file for complete search history.

(56) References Cited

U.S. PATENT DOCUMENTS

| | | | | |
|---|---|---|---|---|
| 5,915,091 | A * | 6/1999 | Ludwig et al. ................ | 709/204 |
| 6,356,313 | B1 * | 3/2002 | Champion et al. ............ | 348/558 |
| 7,058,689 | B2 * | 6/2006 | Parker et al. .................. | 709/206 |
| 8,248,449 | B2 * | 8/2012 | Han ............................. | 348/14.02 |
| 2004/0145654 | A1 * | 7/2004 | Motohashi ................. | 348/14.02 |
| 2006/0280167 | A1 | 12/2006 | Pelous et al. | |
| 2007/0169156 | A1 | 7/2007 | Zeng | |
| 2008/0096603 | A1 * | 4/2008 | Sparre ........................ | 455/550.1 |
| 2008/0117282 | A1 * | 5/2008 | Cho ............................. | 348/14.1 |
| 2008/0153499 | A1 | 6/2008 | Lindfors et al. | |
| 2009/0249225 | A1 * | 10/2009 | Beswick et al. .............. | 715/756 |
| 2011/0109716 | A1 * | 5/2011 | Choi ........................... | 348/14.08 |

FOREIGN PATENT DOCUMENTS

| | | |
|---|---|---|
| CN | 1747546 A | 3/2006 |
| CN | 1859566 A | 8/2006 |
| JP | 2006229726 A | 8/2006 |

(Continued)

OTHER PUBLICATIONS

English language International Search Report from the Russian Patent Office in the Russian Federation for Application No. 2010124841/07(035361) dated May 22, 2012.

(Continued)

*Primary Examiner* — Olisa Anwah
(74) *Attorney, Agent, or Firm* — Conley Rose, P.C.; Grant Rodolph

(57) ABSTRACT

A method, a device, and a system for implementing a video call are provided. The method includes: when a video call initiated by a calling party is received, performing media negotiation with the calling party and initiating the video call to a called party; and after the called party makes a response, performing media negotiation with the called party and completing establishment of a video voice channel between the calling party and the called party; and when an indication of the calling party and/or the called party is received, processing a video according to the indication. With the method, device, or system of the present invention, the calling and called users can change video contents viewed by the other party or by himself/herself, which provides the capability of actively controlling the video contents for the calling and called users that conduct a video call and improves the users' interactive capability during the video call.

4 Claims, 3 Drawing Sheets

FOREIGN PATENT DOCUMENTS

| KN | 1020070025449 A | 3/2007 |
|---|---|---|
| KN | 1020070044691 A | 4/2007 |
| KR | 20070075984 A | 7/2007 |
| WO | WO 2007/016270 A2 | 2/2007 |
| WO | WO 2008/132199 A1 | 11/2008 |

OTHER PUBLICATIONS

English Translation of Office Action relating to Russian Patent Application No. 2010124841; filed on Jun. 16, 2010; Huawei Technologies Co., Ltd., CN (2 pgs.).

Office Action from the Korean Patent Office relating to Application No. 2010124841, filing date of Jun. 16, 2010, for Huawei Tech Co., Ltd., (2 pgs.)

Notice to Submit Response from the Korean Patent Office relating to Application No. 10-2010-0056979, dated Jul. 22, 2011, for Huawei Tech Co., Ltd., (3 pgs.).

Partial Translation of First Chinese Office Action of Chinese Application No. 200910203685.9 mailed Apr. 19, 2012.

* cited by examiner

METHOD, DEVICE, AND SYSTEM FOR IMPLEMENTING VIDEO CALL

CROSS-REFERENCE TO RELATED APPLICATION

This application claims priority to Chinese Patent Application No. 200910203685.9, filed on Jun. 17, 2009, which is hereby incorporated by reference in its entirety.

FIELD OF THE TECHNOLOGY

The present invention relates to the field of mobile communication technology, and more particularly to a method, a device, and a system for implementing a video call.

BACKGROUND OF THE INVENTION

With the development of the mobile network, mobile videophone services also become increasingly popular. The mobile videophone services provide on a wireless network multimedia communication services of any combination of media formats such as real-time video, audio, or data, and mainly utilize the wireless network to implement a video call on a mobile device, thereby enabling mobile users to perform interaction of real-time audio, video, and the like, at any place in any time, that is, both parties of the call can see the other party during the conversation.

The videophone services can be implemented in a packet mode or a circuit mode. However, as the 3G network becomes increasingly mature, the videophone services generally refer to videophone services implemented based on a circuit-switched (CS) domain bearer of Wideband Code Division Multiple Access (WCDMA) or Time Division-Synchronous Code Division Multiple Access (TD-SCDMA). The routing rule of the 3G video call is to, after a call is initiated, record a call type (for example, whether it is a video play (VP) call) through bearer capability, analyze a called number, and obtain information of the call such as the service class, service attribute, and type of the called number. The VP may be regarded as a characteristic of the call. Calling characteristic analysis is performed on calls with such characteristic, and a desired routing mode and a desired routing direction are decided according to a result of the analysis.

However, in the existing videophone services, media negotiation and establishment of a media channel of the video call are directly implemented by both calling and called terminals. Thus, during the video call, the calling and called parties can only see the contents shot by the other party's camera but cannot see other contents. As a result, the user's experience is greatly degraded and the demand of the diversity of the existing videophone services cannot be met.

SUMMARY OF THE INVENTION

The present invention is directed to a method, a device, and a system for implementing a video call, so that the calling and called users can change video contents viewed by the other party or by himself/herself, which provides the capability of actively controlling the video contents for the calling and called users of the video call service and improves the users' interactive capability during the video call.

In order to solve the above problem, the present invention provides the following technical solutions.

A method for implementing a video call is provided, which includes the following steps.

When a video call initiated by a calling party is received, media negotiation is performed with the calling party and the video call is initiated to a called party; and after the called party makes a response, media negotiation is performed with the called party and establishment of a video voice channel between the calling party and the called party is completed.

When an indication of the calling party and/or the called party is received, a video is processed according to the indication.

A device for implementing a video call is provided, which includes an establishing unit and an operating unit.

The establishing unit is adapted to, upon receiving a video call initiated by a calling party, perform media negotiation with the calling party and initiate the video call to a called party; and after the called party makes a response, perform media negotiation with the called party and complete establishment of a video voice channel between the calling party and the called party.

The operating unit is adapted to, upon receiving an indication of the calling party and/or the called party, process a video according to the indication.

A system for implementing a video call is further provided, which includes a calling Mobile Switching Center (MSC), a called MSC, and an Enhance Video Contents Platform (EVCP).

The EVCP is connected to the calling MSC and the called MSC, receives a video call initiated by a calling user forwarded by the calling MSC, performs media negotiation with the calling user through the calling MSC, and initiates the video call to a called user through the called MSC; and after the called user makes a response, the EVCP completes media negotiation with the called user through the called MSC and completes establishment of a video voice channel between the calling and called users.

Upon receiving an indication of the calling party and/or the called party, the EVCP processes a video played for the calling party or the called party according to the indication.

It can be seen from the above that, through the method and device according to the embodiments of the present invention, the performing media negotiation with the calling and called terminals, establishing the media channel, and processing the current video according to the indication information of the calling and called parties enable the calling and called users to change the video contents viewed by the other party or by himself/herself, which provides the capability of actively controlling the video contents for the calling and called users of the video call service and improves the users' interactive capability during the video call.

BRIEF DESCRIPTION OF THE DRAWINGS

To illustrate the technical solution according to the embodiments of the present invention or in the prior art more clearly, the accompanying drawings for describing the embodiments or the prior art are given briefly below. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The present invention sets in a video call system an EVCP that supports signaling conversion and media negotiation, utilizes the EVCP to perform media negotiation with calling and called terminals, establishes a media channel between the EVCP and the calling and called parties, and processes a current video according to indication information of the calling and called parties, which enables the calling and called users to change the video contents viewed by the other party or by himself/herself, provides the capability of actively controlling the video contents for the calling and called users of the video call service, and improves the users' interactive capability during the video call.

The technical solution of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
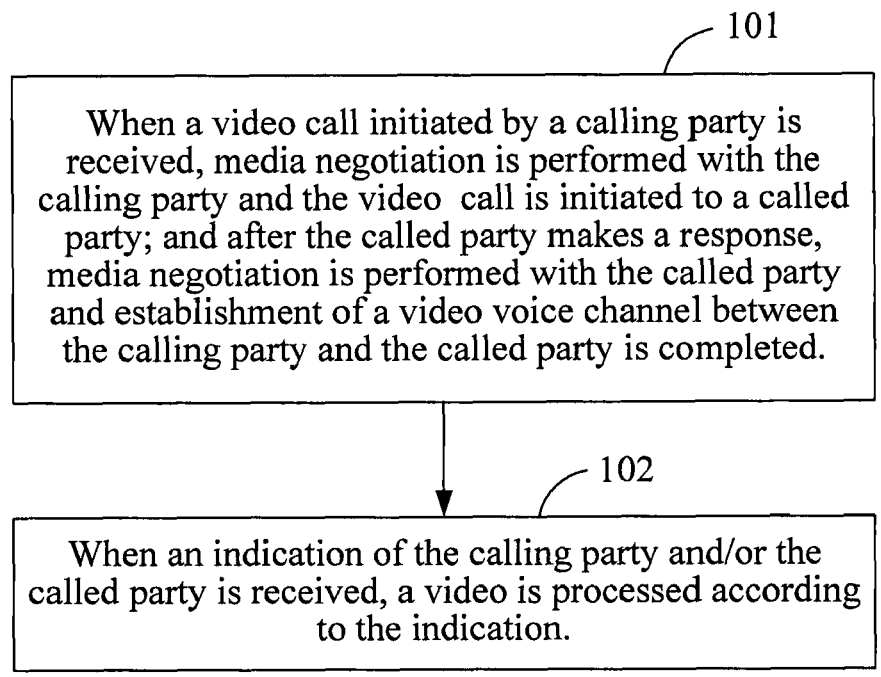
FIG. 1 is a schematic view of the process of a method for implementing a video call according to an embodiment of the present invention.

In an embodiment, the present invention provides a method for implementing a video call, which includes the following steps, as shown in FIG. 1.

In Step 101, when a video call initiated by a calling party is received, media negotiation is performed with the calling party and the video call is initiated to a called party; and after the called party makes a response, media negotiation is performed with the called party and establishment of a video voice channel between the calling party and the called party is completed.

Specifically, when a calling User A initiates a video call to a called User B, the video call initiated by the calling User A and forwarded by an MSC A is received, a video call process is triggered, the video call is initiated to the called User B through an MSC B, and meanwhile capability negotiation is completed with an H.324M terminal of the calling User A. After the called User B makes a response, media negotiation with the called User B is completed, and establishment of a video voice channel between the called User B and the calling User A is performed, which enables the User A and the User B to directly communicate with each other and implement the video call.

When the terminals of the calling and called users are H.324M terminals can a video call service be supported. H.324M is a terminal protocol, and the protocols contained therein include an H.223 data multiplexing and de-multiplexing protocol and an H.245 system control protocol.

In the H.223 data multiplexing and de-multiplexing protocol, control data, voice data, image data, and other data are combined into a set of data to be transmitted by a modem at a transmitting end, and are separated at a receiving end. H.223 is divided into a multiplexing (MUX) layer and an adaptive layer (AL), in which the AL is subdivided into three layers, namely, AL1, AL2, and AL3, the voice data is associated with AL2, the image data is associated with H.223 and AL3, and the control data related to H.245 is associated with AL1.

In the H.245 system control protocol, through messages and processes defined by the protocol, both parties of the call exchange information with each other, and decide how to transmit the voice, image, and data, how to handle errors, and the like. H.245 is divided into two parts, that is, message encoding/decoding and message processing state transition, and an algorithm and an option adopted by the voice and the image are decided by exchange information of H.245.

In the embodiment, the existing H.324 system protocol is utilized to implement the video call between the calling and called users, and complete the media negotiation between the calling and called users, which provides a basis for various video operations in the subsequent ringing state and conversation state.

In Step 102, when indication information of the calling party and/or the called party is received, a video is processed according to the indication.

In the embodiment, the indication information of the calling and called parties may include, but not limited to, key information of the calling and called users. The contents to be indicated by the current calling and called users can be determined according to different key information received at different time periods, such as the ringing state and the conversation state.

Specifically, when the indication information is implemented in a key form, the processing the video according to the indication information may include, but not limited to, the following modes.

A. After the key information of the calling user is received through transparent transmission of a Dual Tone Multi Frequency System (DTMF), the following operations may be implemented according to indication contents of the key information.

1) After the video voice channel is successfully established, the real-time video content of the calling party and the video content preset by the calling party are overlaid and then presented to the called party.

2) If the indication information corresponding to the key information is video playback, the video contents pre-viewed or preset by the calling party are played back for the calling user; and preferably, the contents are played back in seconds.

3) If the indication information corresponding to the key information is video recording, audio and video streams from the called side to the calling side are recorded, that is, the video contents viewed and/or the audio contents heard by the calling user are recorded and stored to a service server for subsequent extraction.

B. After the key information of the called user is received through transparent transmission of a DTMF, the following operations may be implemented according to indication contents of the key information.

1) After the video voice channel is successfully established, the real-time video content of the called party and the video content preset by the called party are overlaid and then presented to the calling party.

2) If the indication information corresponding to the key information is video playback, the video contents pre-viewed or preset by the called party is played back for the called user; and preferably, the contents are played back in seconds.

3) If the indication information corresponding to the key information is video recording, audio and video streams from the calling side to the called side are recorded, that is, the video contents viewed and/or the audio contents heard by the called user are recorded and stored to a service server for subsequent extraction.

It should be noted that, in the foregoing several modes for processing the video, the real-time video contents of the calling or called party may be corresponding contents shot by a camera of the calling or called party and may certainly be video contents of other modes, which is not specifically limited in the embodiment.

Figure 2:
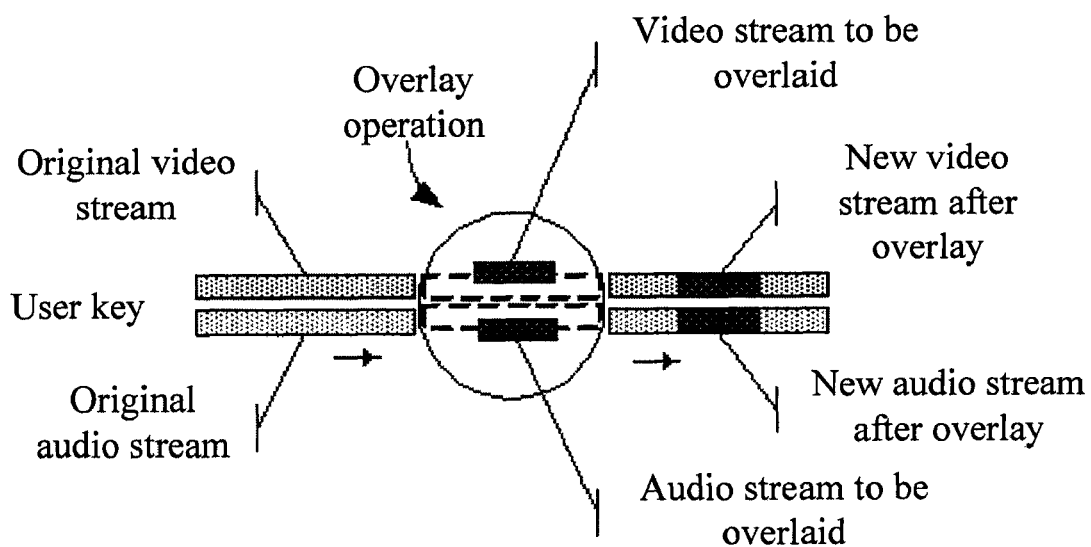
FIG. 2 is a schematic view of video overlay in the method for implementing a video call according to an embodiment of the present invention.

As shown in FIG. 2, the overlaying the video contents includes: first de-multiplexing real-time audio and video streams of a terminal, and after completing media stream format conversion and multiplexing of the video media stream and the audio media stream, overlaying the audio and video media streams with preset audio and video streams. Specifically, taking the overlaying of the video stream as an example, information of each frame of an original video stream is extracted, synthetic processing is performed on an extracted original image frame and an image frame of the video stream to be overlaid, new video frame data after the synthetic processing is transferred to an encoder for encoding, and then the new video frame data is multiplexed, sent to a channel, and presented to the other party. The original video stream may be video contents shot by a camera, the image frame of the video stream to be overlaid is a preset video stream, and the synthetic processing may be split screen, picture in picture (PIP), complete replacement, and the like. Certainly, other modes may also be adopted to perform video overlay, which will not be described herein.

Moreover, it should be noted that, the method of the embodiment may further include: Step 103, after the media negotiation with the calling party is completed, playing the video content preset by the called party for the calling party; and/or Step 104, after the media negotiation with the called party is completed, playing the video content preset by the calling party for the called party.

In the specific implementation, the preset video content in the embodiment of the method may be an advertisement of an enterprise, a piece of funny video, animation, or movie, and may also be any content such as vivid expression pictures or a piece of text caption. The mode of overlaying and presenting the video is also varied, which includes, but not limited to, the following contents.

1) Overlaying the caption: the caption may be overlaid on the original real-time video content with various effects such as scrolling and flickering. 2) Complete replacement: the real-time video content of the original calling and called parties is replaced with the preset video content in full screen, so as to better protect the privacy. 3) Overlaying the preset video content on the original video content: the overlay location may be based on the original picture and the overlay may also be carried out in modes of split screen and PIP; the specific mode of the overlay may be set according to actual requirements, which will not be described herein.

It can be seen from the above that, with the method of the embodiments of the present invention, both the calling and called parties may change the video content viewed by the other party or by himself/herself in a mode such as key, and may even play back and record the video content through the key, thereby providing the capability of actively controlling the video content for the calling and called users that conduct a video call and improving the users' interactive capability during the video call. Besides, the method significantly improves the user's service experience of using the videophone and provides a value-added service form for the user to show his/her personality, which is in line with the service use custom and consuming psychology of Chinese mobile phone users and has good market prospects and application and popularization values. Meanwhile, a good commercial carrier may be provided for operators, enterprises, and the like and commercial values are enhanced through the preset customized video content.

Figure 3:
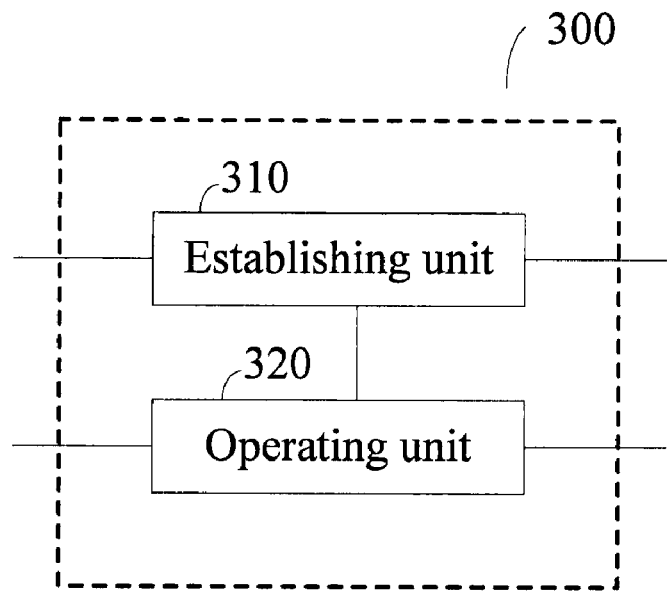
FIG. 3 is a schematic block diagram of a structure of a device for implementing a video call according to an embodiment of the present invention.

In an embodiment, the present invention further provides a device 300 for implementing a video call, which includes an establishing unit 310 and an operating unit 320, as shown in FIG. 3.

The establishing unit 310 is adapted to, upon receiving a video call initiated by a calling party, perform media negotiation with the calling party and initiate the video call to a called party; and after the called party makes a response, perform media negotiation with the called party and complete establishment of a video voice channel between the calling party and the called party.

The operating unit 320 is adapted to, upon receiving an indication of the calling party and/or the called party, process a video according to the indication.

The operating unit 320 may include: an overlaying module 321 adapted to overlay and present to the called party a real-time video content of the calling party and a video content preset by the calling party according to a key information indication of the calling party; and overlay and present to the calling party a real-time video content of the called party and a video content preset by the called party according to a key information indication of the called party.

Preferably, the overlaying module 321 may include: an extracting module, a synthesizing module, and a multiplexing module. The extracting module is adapted to extract information of each frame of an original real-time video stream. The synthesizing module is adapted to perform synthetic processing on an original image frame extracted by the extracting module and an image frame of the video stream to be overlaid. The multiplexing module is adapted to encode, multiplex, and send out new video frame data after the synthetic processing.

In the specific implementation, the operating unit 320 may further include: a playback module 322 adapted to, if the indication corresponding to key information of the calling party or the called party is video playback, play back previewed or preset video contents for the calling or called user; and/or a recording module 323 adapted to, if the indication corresponding to key information of the calling party or the called party is video recording, record video contents viewed and/or audio contents heard by the calling or called user, and store the recorded contents to a service server.

Figure 4:
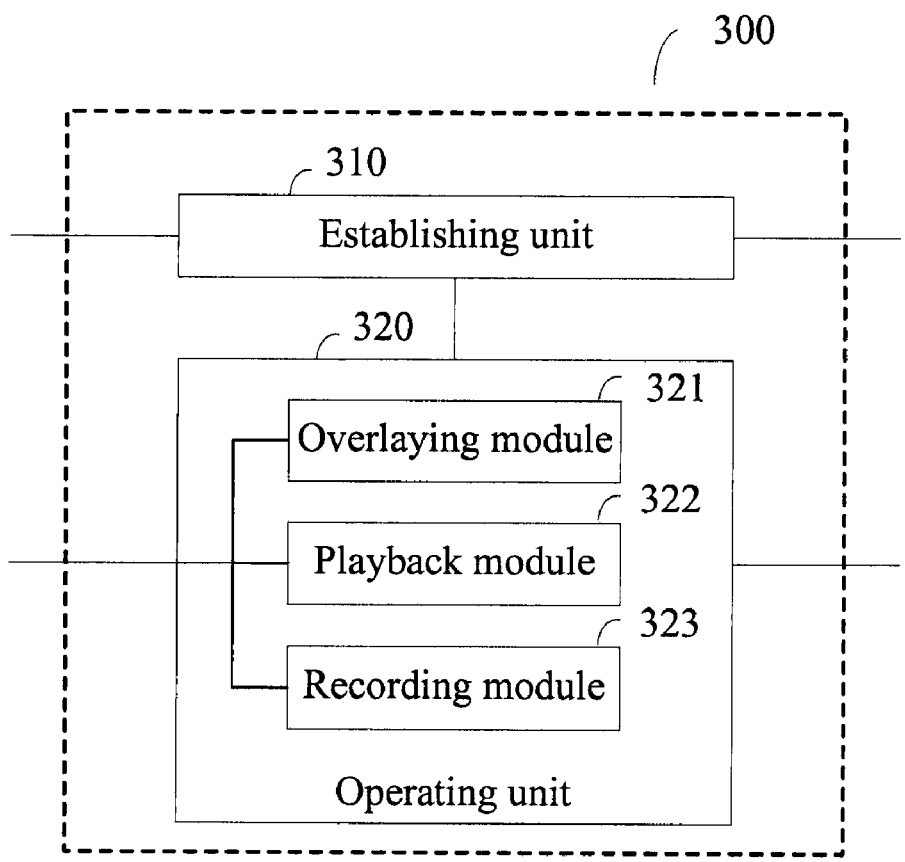
FIG. 4 is a schematic block diagram of another structure of the device for implementing a video call according to an embodiment of the present invention.

It should be noted that, the modules included in the operating unit 320 of the embodiment may exist separately or coexist, which is not specifically limited in the embodiment. The structure that the plurality of modules exists simultaneously is shown in FIG. 4, and the functions of each module and its connection relations with the other devices are as stated above, which will not be described herein again.

Moreover, the device 300 further includes: a playing module adapted to play the video content preset by the called party for the calling party after completing the media negotiation with the calling party, and/or play the video content preset by the calling party for the called party after completing the media negotiation with the called party.

Figure 5:
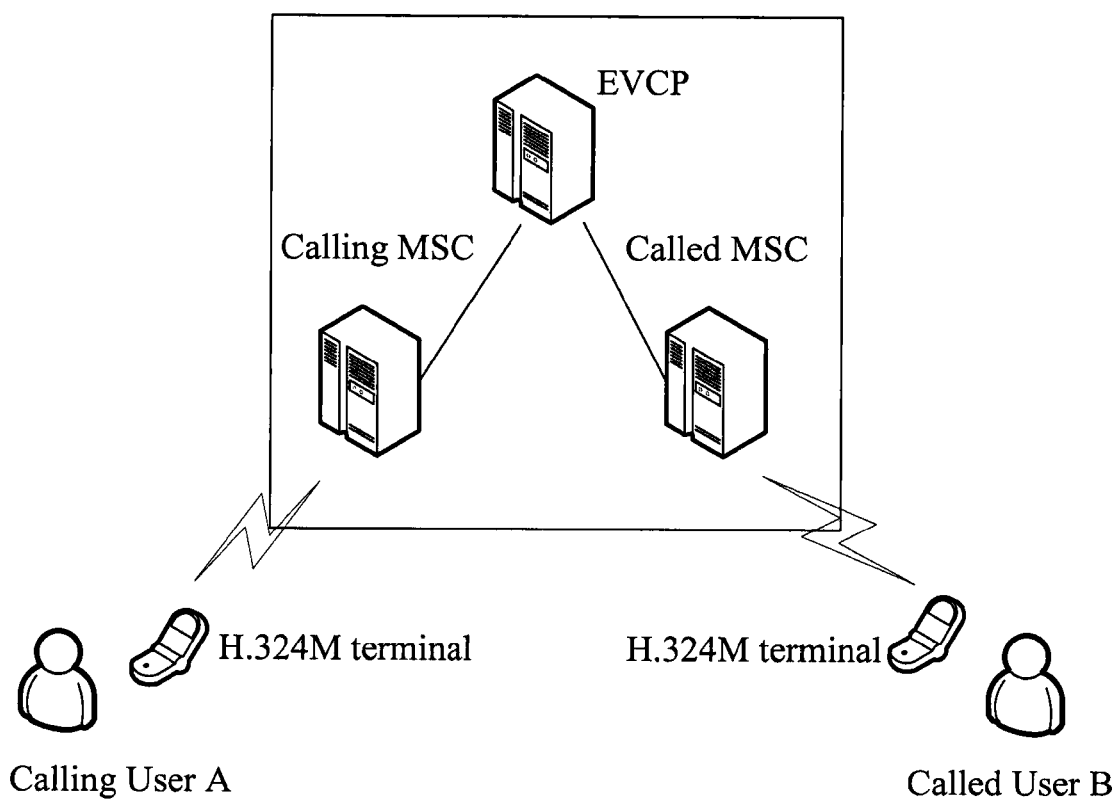
FIG. 5 is a schematic block diagram of the structure of a system for implementing a video call according to an embodiment of the present invention.

It should be noted that, the device of the embodiment usually fulfils corresponding functions in a mobile communication system; therefore, the system including the device according to the embodiment of the present invention may also fall within the protection scope of the present invention. Detailed descriptions will be given below by taking a video call system including an H.324M terminal for example. As shown in FIG. 5, the system includes a calling MSC, a called MSC, and an EVCP.

The EVCP is connected to the calling MSC and the called MSC, supports functions of signaling conversion and media negotiation, performs media negotiation with calling and called terminals through the calling MSC and the called MSC respectively, and establishes media channels between the calling party and the EVCP and between the EVCP and the called party. Upon receiving an indication of the calling or called party, the EVCP processes the video played for the calling or called party according to the indication, and executes procedures such as video call service access, media play, audio and video format conversion, and multiplexing functions.

Specifically, when a calling User A calls a called User B, the calling MSC receives a video call from the User A, and transfers the video call to the EVCP. Upon receiving the video call, the EVCP performs call processing, triggers a video call service process, and initiates the video call to the called User B. Meanwhile, the EVCP completes capability negotiation with an H.324M terminal of the calling User A, further completes media stream format conversion and multiplexing of the video media stream and the audio media stream, and plays the video media stream and the audio stream for the calling terminal. After the called User B makes a response, the EVCP completes media negotiation with the called User B, and completes establishment of a voice channel between the called User B and the calling User A. At this time, the EVCP is spanned between the calling and called MSCs to provide a bearer channel, and the voice channel between the calling and called parties is bypassed to the EVCP. The EVCP is responsible for number receiving processing and multiplexes the processed video stream and audio stream to a user channel until the video call is released.

During the call connection, upon completing the capability negotiation with a calling H.324M terminal, the EVCP may further play for the calling terminal the video content preset by the called party. Alternatively, if the EVCP receives key information of the calling party at this time, the EVCP views the video content preset by the calling party and plays for the called user the video content preset by the calling party. Meanwhile, upon completing the capability negotiation with a called H.324M terminal, the EVCP may also execute the foregoing steps, which will not be described herein again.

During the conversation, that is, after the called user makes a response, the EVCP completes the media negotiation with a called terminal user, and performs establishment of a voice channel between the calling and called parties. At this time, the EVCP is spanned between the calling and called MSCs to provide a bearer channel, and the voice channel between the calling and called parties must be bypassed to the EVCP. Then, during the conversation, if the EVCP receives the key information of the calling and called parties, the EVCP processes the current video according to the content of the key information indication. The operations include, but not limited to, the following contents.

A. After the video voice channel is successfully established, the EVCP overlays the real-time video stream of the calling or called party and the video content preset by the calling or called party and then presents the overlaid contents to the called or calling party.

B. If the indication information corresponding to the key information received by the EVCP is video playback, the EVCP plays back the pre-viewed or preset video contents for the user that sends the indication; and preferably, the contents are played back in seconds.

C. If the indication information corresponding to the key information received by the EVCP is video recording, the EVCP records audio and video streams received by the user that sends the indication, that is, records the video contents viewed and/or the audio contents heard by the user that sends the indication, and stores the recorded contents to a service server for subsequent extraction.

Through the system of the embodiment, the calling and called parties may switch the received video content in modes such as key, and may also, in the conversation state, control the played video content using indication information such as key, thereby providing the capability of actively controlling the video contents for the calling and called users that conduct a video call and improving the users' interactive capability during the video call.

Persons skilled in the art may further realize that, in combination with the embodiments herein, units and algorithm steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the present invention.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The descriptions about the embodiments enable persons skilled in the art to implement or use the embodiments of the present invention. Various modifications to the embodiments are obvious to persons skilled in the art, and general principles defined herein may be implemented in other embodiments without departing from the spirit or scope of the present invention. Therefore, the embodiments of the present invention may not be limited to the descriptions herein but shall fall within the broadest scope in line with the principle and novel features herein.

The above descriptions are merely preferred embodiments of the present invention, but not intended to limit the present invention. Any modification, equivalent replacement, or improvement made without departing from the spirit and principle of the present invention shall fall within the scope of the present invention.

What is claimed is:

1. A method for implementing a video call, comprising:
   performing, by a Enhance Video Contents Platform (EVCP), a media negotiation with the calling party and initiating the video call to a called party when a video call request initiated by a calling party is received; and
   performing, by the EVCP, a media negotiation with the called party and completing establishment of a video voice channel between the calling party and the called party after the called party makes a response; and
   overlaying, by the EVCP, a real-time video content of the calling party and a video content preset by the calling party according to a key information indication of the calling party and presenting the overlaid video content to the called party when the key information indication of the calling party is received; and/or overlaying, by the EVCP, a real-time video content of the called party and a video content preset by the called party according to a key information indication of the called party and presenting the overlaid video content to the calling party when the key information indication of the called party is received, and wherein the video content comprises video media stream, and wherein overlaying the real-time video media stream with the preset video media stream comprises extracting information of each frame of the real-time video media stream, performing a synthetic processing on the extracted frame of the real-time video media stream and a frame of the preset video media stream, and encoding, multiplexing, and sending out the synthesized frame after the synthetic processing.

2. A device for implementing a video call, comprising:
an establishing unit; and
an operating unit, and
wherein the establishing unit is configured to:
   perform a media negotiation with the calling party and initiate the video call to a called party upon receiving a video call request initiated by a calling party; and
   perform a media negotiation with the called party and complete establishment of a video voice channel between the calling party and the called party after the called party makes a response, and
wherein the operating unit comprises an overlaying module configured to overlay a real-time video content of the calling party and a video content preset by the calling party according to a key information indication of the calling party and present the overlaid video content to the called party, and/or
wherein the operating unit comprises an overlaying module configured to overlay a real-time video content of the called party and a video content preset by the called party according to a key information indication of the called party and present the overlaid video content to the calling party, and
wherein the video content comprises video media stream, and
wherein overlaying the real-time video media stream with the preset video media stream comprises extracting information of each frame of the real-time video media stream, performing a synthetic processing on the extracted frame of the real-time video media stream and a frame of the preset video media stream, and encoding, multiplexing, and sending out the synthesized frame after the synthetic processing.

3. A system for implementing a video call, wherein the system further comprises:
a calling Mobile Switching Center (MSC); and
a called MSC; and
an Enhance Video Contents Platform (EVCP), and
wherein the EVCP receives a video call request initiated by a calling user forwarded by the calling MSC, performs a media negotiation with the calling user through the calling MSC, and initiates the video call request to a called user through the called MSC, and wherein the EVCP completes a media negotiation with the called user through the called MSC and completes an establishment of a video voice channel between the calling and called users after the called user makes a response, and wherein the EVCP overlays a real-time video content of the calling party and a video content preset by the calling party according to a key information indication of the calling party and presents the overlaid video content to the called party upon receiving the key information indication of the calling party; and/or wherein the EVCP overlays a real-time video content of the called party and a video content preset by the called party according to a key information indication of the called party and presents the overlaid video content to the calling party upon receiving the key information indication of the called party, and wherein the video content comprises video media stream, and wherein the EVCP overlays the real-time video media stream with the preset video media stream comprises the EVCP extracts information of each frame of the real-time video media stream, performs a synthetic processing on the extracted frame of the real-time video media stream and a frame of the preset video media stream, and encodes, multiplexes, and sends out the synthesized frame after the synthetic processing.

4. A non-transitory computer readable medium, comprising computer program code, which, when executed by a computer unit, will cause the computer unit to perform the steps:
   performing a media negotiation with the calling party and initiating the video call to a called party when a video call initiated by a calling party is received; and
   performing a media negotiation with the called party and completing establishment of a video voice channel between the calling party and the called party after the called party makes a response; and
   overlaying a real-time video content of the calling party and a video content preset by the calling party according to a key information indication of the calling party and presenting the overlaid video content to the called party when the key information indication of the calling party is received; and/or
   overlaying a real-time video content of the called party and a video content preset by the called party according to a key information indication of the called party and presenting the overlaid video content to the calling party when the key information indication of the called party is received, and
wherein the video content comprises video media stream, and
wherein overlaying the real-time video media stream with the preset video media stream comprises extracting information of each frame of the real-time video media stream, performing a synthetic processing on the extracted frame of the real-time video media stream and a frame of the preset video media stream, and encoding, multiplexing, and sending out the synthesized frame after the synthetic processing.

* * * * *

UNITED STATES PATENT AND TRADEMARK OFFICE
CERTIFICATE OF CORRECTION

PATENT NO.         : 8,396,197 B2
APPLICATION NO.    : 12/815697
DATED              : March 12, 2013
INVENTOR(S)        : Chaoqun Jiang It is certified that error appears in the above-identified patent and that said Letters Patent is hereby corrected as shown below:

In the Claims:

Column 9 Line 52 should read as follows:

> 3. A system for implementing a video call, wherein the system comprises:
> a calling Mobile Switching Center (MSC); and
> a called MSC; and
> a Enhance Video Contents Platform (EVCP), and
> wherein the EVCP receives a video call request initiated by a calling user forwarded by the calling MSC, performs a media negotiation with the calling user through the calling MSC, and initiates the video call request to a called user through the called MSC, and
> wherein the EVCP completes a media negotiation with the called user through the called MSC and completes an establishment of a video voice channel between the calling and called users after the called user makes a response, and
> wherein the EVCP overlays a real-time video content of the calling party and a video content preset by the calling party according to a key information indication of the calling party and presents the overlaid video content to the called party upon receiving the key information indication of the calling party; and/or
> wherein the EVCP overlays the real-time video content of the called party and a video content preset by the called party according to a key information indication of the called party and presents the overlaid video content to the calling party upon receiving the key information indication of the called party, and
> wherein the video content comprises video media stream, and
> wherein the EVCP overlays the real-time video media stream with the preset video media stream comprises the EVCP extracts information of each frame of the real-time video media stream, performs a synthetic processing on the extracted frame of the real-time video media stream and a frame of the preset video media stream, and encodes, multiplexes, and sends out the synthesized frame after the synthetic processing.

Signed and Sealed this
Fourteenth Day of May, 2013

Teresa Stanek Rea
*Acting Director of the United States Patent and Trademark Office*